May 15, 1928.
K. O. SCHAUMAN ET AL
1,669,536
BUMPER
Filed June 23, 1927
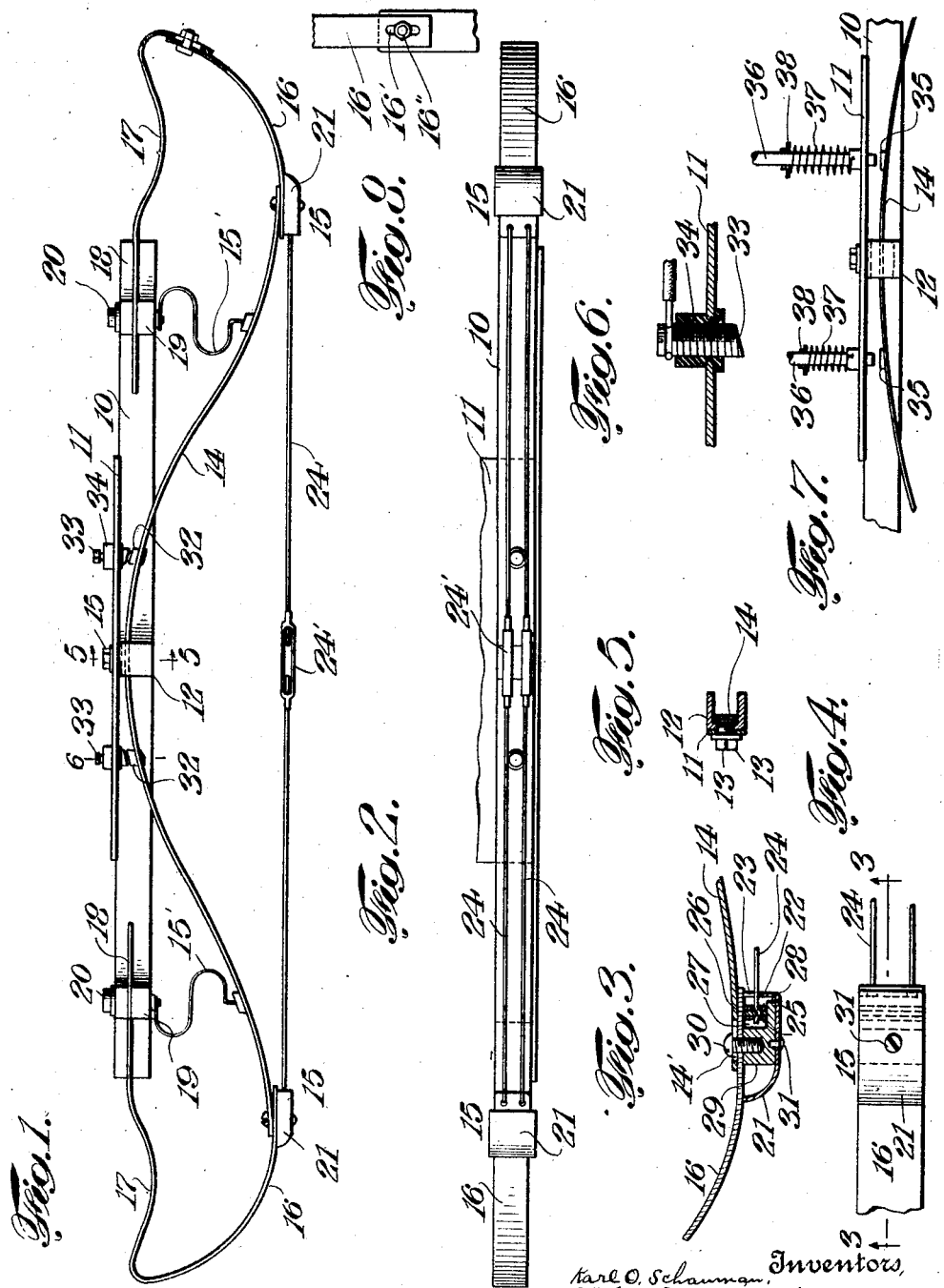

Patented May 15, 1928.

1,669,536

UNITED STATES PATENT OFFICE.

KARL O. SCHAUMAN, STIRLING R. YANCEY, AND JOSE L. MIFSUD, OF NEW YORK, N. Y., ASSIGNORS TO SURE-GUARD CORPORATION, OF NEW YORK, N. Y., A CORPORATION OF NEW YORK.

BUMPER.

Application filed June 23, 1927. Serial No. 200,801.

Our invention relates to an improvement in bumpers or guards for vehicles especially motor vehicles. Our invention is intended to produce a simple, resilient and yet sufficiently stiff guard or bumper which can be applied to either end of a vehicle and which will protect the vehicle which carries it and the vehicle which strikes it from injury, to a great extent at least and which, also, is intended to guard a pedestrian from serious injury.

The invention is in the form of a simple spring structure in which elements are shaped, attached and disposed in such a manner that a shock occasioned by striking the bumper will be distributed through all parts thereof and absorbed.

The invention is, also, particularly adapted for attachment to vehicles which are equipped with automatic controls, that is, with apparatus which acts either electrically, mechanically, pneumatically, or hydraulically, to apply the brakes, cut off the ignition, or operate visual or audible signals when the bumper is struck.

Our improved bumper works to advantage in connection with any of these instrumentalities, which will appear from the description which follows:

Reference is to be had to the accompanying drawings forming a part of this specification in which similar reference characters refer to similar parts throughout the several views.

Figure 1 is a plan view of the bumper embodying our invention showing it attached to a vehicle rail.

Figure 2 is a front elevation of the bumper.

Figure 3 is an enlarged section of a spring coupling on the line 3—3 of Figure 4.

Figure 4 is a broken face view of the coupling which connects some of the spring elements.

Figure 5 is a detail on the line 5—5 of Figure 1.

Figure 6 is a detail section on the line 6 of Figure 1.

Figure 7 is a broken plan view of a modification of the bumper.

Figure 8 is a broken detail of a part of one of the spring extensions.

The bumper can be conveniently applied to the part 10 of a vehicle and there is usually a rail or cross bar near the end of the vehicle corresponding to the structure shown. To this is applied rigidly a plate 11 and near the center of this plate and on the outer side is secured an open channel iron 12 with the open side out. This can be conveniently applied to the plate 11 by a bolt 13, and it affords a rigid support for the bow spring 14 which is of a width to fit nicely in the channel with its back to the back of the channel and with its widest part vertically arranged.

The spring 14 bows outward from both sides of the channel 12 as the drawing shows and connects with the other elements of the bumper by the couplings 15 at each end of the spring 14 which provides for a slight sliding or lost motion as will hereinafter appear.

The ends of the spring 14 connect through the couplings 15 with the springs 16 which really serve as extensions of the springs 14. These springs 16 curve inward as shown in Figure 1 and are bent sharply inward and slightly forward as at 17, their end portions being parallel with member 10 and being secured between clamping blocks 19 on the member 10. Set screws 20 can be used to fasten the spring ends.

The extension members 16 can be made in one piece but they are preferably in two pieces, as shown in Figure 8 so that the outer part can move slightly with reference to the inner part. This sliding connection can be of any approved kind, for example, the inner part may be slotted as shown at 16' and the outer part can have a stud 16" moving in the slot. This arrangement makes the bumper more sensitive and enables it to respond to its inner movement when it is struck at an angle which might not be effective if the extension member were in one piece. The cross spring 14 is normally pushed forward by light springs 15' arranged near the ends of the bumper and between the spring 14 and the blocks 19. These springs do not prevent the inward movement of the cross spring when the bumper is subjected to impact.

Each coupling 15 includes in part a casing 21, one end of which is bent sharply inward as at 22 and slotted as at 23 to receive the transverse cables 24. These cables are preferably of wire but they can be of any approved material and there can be any desired number of them.

In the drawing, we have shown two cables which are placed in parallel relation and form the outer flat contacting surface of the bumper. The ends of the cables can be fastened in any convenient way but we have shown a preferred way in which the cable ends are thrust through holes in plates 25 (see Figure 3) and in a middle plate 26, the latter being normally out of registry with the other plates.

The three plates comprising the two plates 25 and the plate 26 are then wedged into their pocket 27 between the lug 28 of the boss 29 and a part of the spring 16. This forces the plate 26 to move so as to bend the cable ends as the drawing shows and securely lock them in place.

The boss 29 is held in place by a screw 30 which fastens the spring end 16 to the boss and which, also, extends through a slot 14' in the end of the spring 14. The casing 21 is held to the boss by the screw 31 and, thus, it will be seen that the coupling 15 secures the meeting ends of the springs 14 and 16 so as to permit a slight motion of one with reference to the other and, also, furnishes a yielding but sufficiently taut support for the cables 24.

These cables are provided with turnbuckles 24' or an equivalent means of tightening them.

If the bumper is to be used on vehicles equipped with electrically operated or tripped controls as described, the bumper is easily adapted to close a contact necessary to trip such a control. To this end, the spring 14 has preferably two contacts 32, one on each side of the central part of the spring to insure contact and opposite these contacts which are movable, are the fixed contacts 33 which are supported in insulation 34 in the plate 11. Thus, if the bumper is struck or strikes anything, its inward movement will distribute the shock through the several plates as described and more particularly pointed out below and will be sure to close one pair of contacts which will be sufficient to close the operating circuit of the car control.

Some of these controls are not operated electrically or tripped electrically but are tripped or operated by the movement of some part as, for example, a rod. To adapt the bumper to this type of control, it is only necessary to substitute abutments 35 for the contacts 32 and mount slide rods 36 in the plate 11 opposite the abutments so that when the abutments are moved inward by the action of the bumper, it will move one or both of the rods. These rods can be normally pressed outward by springs 37 abutting against a collar 38 which may be supported on a convenient part of the car.

From the foregoing description, it will be seen that we have produced a very simple and inexpensive bumper which can be conveniently attached and which has the springs 14 and 16 supported in such a way that any shock caused by impact against the cables 24 will be distributed through a very long extent of bow springs and the slight lost motion between the springs 14 and 16 permits a slight sliding of the couplings 15 before shock is imparted to the spring 14.

Arrangement of this spring so that it is held freely but firmly near the center, permits it to adjust itself to shocks coming from practically any direction against it and it will be noted that the structure is very firm and that besides offering a reliable yielding resistance to impact, it, also, affords a positive means of transmitting its motion either through an electric circuit or other means to work any usual or preferred type of car control.

We claim:

1. A vehicle bumper comprising a bow spring supported near the center to move transversely and lengthwise of the spring, and guard members connecting the outer end parts of this spring.

2. A vehicle bumper comprising a bow spring having its middle portion mounted in a support, lateral extensions extending from the outer end parts of the spring members, and curving back, and supported at the sides of the middle part of the spring, and guard members connecting the outer end parts of the bow spring.

3. A vehicle bumper comprising a bow spring, means for supporting the spring at its middle portion, spring extensions connected with the end portions of the bow spring, and extending laterally and inwardly with their ends anchored, and guard members connecting the outer parts of the bow spring.

4. A vehicle bumper comprising a bow spring, means for supporting the bow spring near its middle portion to permit movement lengthwise of the spring, and also an outward and inward movement with relation to its support, extension spring members connected to the outer ends of the bow spring, said members curving laterally and inwardly and being anchored at their inner ends, and guard members connecting the outer parts of the bow spring.

5. A vehicle bumper comprising a bow spring, means for supporting the spring near its middle portion, laterally extending spring members having a sliding connection with the bow spring ends, and their inner ends anchored to a support, and guard members connecting the outer end parts of the bow spring.

6. A vehicle bumper comprising a bow spring, means for supporting the middle portion of the spring on a vehicle, spring extensions curving laterally and inwardly from the bow spring ends, means for anchoring the inner ends of the extensions, guard members connecting the outer parts of the bow spring, and couplings uniting the guard members, bow spring ends, and extensions.

7. A vehicle bumper comprising a bow spring, means for supporting the back of the spring on a vehicle, laterally extending spring members connecting the bow spring ends with a rigid support, guard members connecting the outer portions of the bow spring ends, and means for adjusting the guard members.

8. A vehicle bumper comprising a bow spring, means for supporting its middle portion to permit a limited free movement, lateral spring extensions connecting the bow spring ends with a support, a sliding connection between the extensions and bow spring, and guard members coupled to the outer portions of the bow spring and the outer portions of the extensions.

9. A vehicle bumper comprising a rigid channel member, a bow spring with its back held in the channel, and its members extending outwardly and laterally, lateral spring extensions connecting the bow spring ends with a support, and guard members connecting the outer parts of the bow spring.

10. A vehicle bumper comprising a bow spring supported near its center, and with its arms projecting outwardly and laterally, guard members connecting the outer parts of the bow spring, and members actuated by the movement of the bow spring to set in motion an adjacent and independent part.

11. A vehicle bumper comprising a bow spring supported near its center portion, lateral spring extensions connected with the outer parts of the bow spring, and curving laterally and inwardly to a support, guard members connecting the outer parts of the bow spring, and auxiliary members actuated by the inward movement of the bow spring and acting to set in motion an independent part.

12. A vehicle bumper comprising a bow spring supported near its middle portion and with outwardly diverging arms, guard members connecting the outer end parts of the bow spring, and an electric contact actuated by the inward movement of the bow spring.

13. A vehicle bumper comprising a bow spring supported near its center and with outwardly and laterally extending arms, guard members connecting the outer end parts of the bow spring, and electric contacts disposed on opposite sides of the middle part of the bow spring and actuated by the inward movement of said bow spring.

14. A vehicle bumper according to claim 2 further characterized by the fact that the lateral extensions are in separate parts having a limited sliding movement one on the other.

In testimony whereof, we have signed our names to this specification this 21st day of June, 1927.

KARL O. SCHAUMAN.
STIRLING R. YANCEY.
JOSE L. MIFSUD.